United States Patent
Petrangeli et al.

(10) Patent No.: US 11,425,368 B1
(45) Date of Patent: Aug. 23, 2022

(54) LOSSLESS IMAGE COMPRESSION USING BLOCK BASED PREDICTION AND OPTIMIZED CONTEXT ADAPTIVE ENTROPY CODING

(71) Applicant: Adobe Inc., San Jose, CA (US)

(72) Inventors: Stefano Petrangeli, Mountain View, CA (US); Viswanathan Swaminathan, Saratoga, CA (US); Haoliang Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/177,592

(22) Filed: Feb. 17, 2021

(51) Int. Cl.
*H04N 19/105* (2014.01)
*H04N 19/182* (2014.01)
*H04N 19/91* (2014.01)
*H04N 19/176* (2014.01)

(52) U.S. Cl.
CPC ......... *H04N 19/105* (2014.11); *H04N 19/176* (2014.11); *H04N 19/182* (2014.11); *H04N 19/91* (2014.11)

(58) Field of Classification Search
None
See application file for complete search history.

(56) References Cited

U.S. PATENT DOCUMENTS

| 10,855,999 | B2 * | 12/2020 | Kirchhoffer | ......... | H04N 19/136 |
| 2016/0165236 | A1 * | 6/2016 | Ikeda | .................. | H04N 19/186 |
| | | | | | 375/240.13 |
| 2020/0366906 | A1 * | 11/2020 | Winken | ............... | H04N 19/463 |
| 2021/0120247 | A1 * | 4/2021 | Galpin | ..................... | G06N 3/02 |
| 2021/0127116 | A1 * | 4/2021 | Chen | ................... | H04N 19/139 |

OTHER PUBLICATIONS

Abdoli et al., "Intra Block-DPCM With Layer Separation of Screen Content in VVC," 2019.*
Kim et al., "Improvement of Implicit Residual DPCM for HEVC," 2014 Tenth International Conference on Signal-Image Technology & Internet-Based Systems, 2014.*
Cao et al., "Lossless Image Compression through Super-Resolution", arXiv:2004.02872v1, Apr. 6, 2020, pp. 1-18.
Mentzer et al., "Practical Full Resolution Learned Lossless Image Compression", Computer Vision and Pattern Recognition, CVPR'19, 2019, pp. 110629-10638.
Vcodex, "H.264/AVC Intra Prediction", Available Online at <https://www.vcodex.com/h264avc-intra-precition/>, Retrieved on Jan. 18, 2022, pp. 1-7.
Wallace, Gregory K.,"The JPEG Still Picture Compression Standard", IEEE Transactions on Consumer Electronics, vol. 38, No. 1, Feb. 1992, 17 pages.

* cited by examiner

*Primary Examiner* — Michael J Hess
(74) *Attorney, Agent, or Firm* — NDWE LLP

(57) ABSTRACT

Embodiments are disclosed for lossless image compression using block-based prediction and context adaptive entropy coding. A method of lossless image compression using block-based prediction and context adaptive entropy coding comprises dividing an input image into a plurality of blocks, determining a pixel predictor for each block based on a block strategy, determining a plurality of residual values using the pixel predictor for each block, selecting a subset of features associated with the plurality of residual values, performing context modeling on the plurality of residual values based on the subset of features to identify a plurality of residual clusters, and entropy coding the plurality of residual clusters.

14 Claims, 10 Drawing Sheets

|   | Y |   |   | 300 |
|---|---|---|---|---|
| 0 | 1 | 0 | 2 | 3 |
| 3 | 3 | 2 | 2 | 1 |
| 0 | 0 | 1 | 1 | 2 |
| 2 | 3 | 2 | 1 | 0 |
| 1 | 1 | 2 | 0 | 0 |

|   | Co |   |   | 302 |
|---|---|---|---|---|
| 0 | 1 | 0 | 2 | 3 |
| 3 | 3 | 2 | 2 | 1 |
| 0 | 0 | 1 | 1 | 2 |
| 2 | 3 | 2 | 1 | 0 |
| 1 | 1 | 2 | 0 | 0 |

|   | Cg |   |   | 304 |
|---|---|---|---|---|
| 0 | 1 | 0 | 2 | 3 |
| 3 | 3 | 2 | 2 | 1 |
| 0 | 0 | 1 | 1 | 2 |
| 2 | 3 | 2 | 1 | 0 |
| 1 | 1 | 2 | 0 | 0 |

*FIG. 3*

LOSSLESS IMAGE COMPRESSION USING BLOCK BASED PREDICTION AND OPTIMIZED CONTEXT ADAPTIVE ENTROPY CODING

BACKGROUND

In general, data compression reduces the size of a digital file. For example, one type of compression algorithm typically makes the digital file smaller by representing strings of bits (i.e., logical 1s and 0s), which make up the digital file, with smaller strings of bits by using a dictionary, or so-called codebook. This reduction typically happens at the encoding stage prior to transmission or storage. So, when such a reduced-size string is received at the decoding stage for playback, the decoding algorithm uses the codebook to reconstruct the original content from the compressed representation generated by the encoding algorithm. Whether the reconstructed content is an exact match of the original content or an approximation thereof depends on the type of compression employed. Lossless image compression algorithms allow the original content to be reconstructed exactly from the compressed message, while lossy compression algorithms only allow for an approximation of the original message to be reconstructed. The ability to compress data more efficiently, in a lossless manner, is of increasing importance, particularly in cloud-based environments where smaller file sizes lead to less storage resource requirements and communication bandwidth requirements to store and transfer compressed data.

These and other problems exist with regard to image compression in electronic systems.

SUMMARY

Introduced here are techniques/technologies that improve performance of lossless image compression algorithms. A typical lossless image compression algorithm may include pixel value prediction and residual computation, context modeling, and context-adaptive entropy encoding. Embodiments provide both improved pixel value prediction and context modeling as compared to prior techniques. For example, an input image may be divided into blocks, and each block may be associated with a pixel predictor that performs best for that block. By reducing the area of the image associated with a given pixel predictor, prediction performance can be greatly improved. This reduces the error (e.g., amplitude) of the residuals (e.g., the difference in pixel value between the predicted value and the actual value), which leads to improved compression performance.

One or more embodiments also perform machine learning-based context modeling, which groups pixels with similar characteristics. A machine learning model, such as a decision tree model, can receive the residuals as well as a set of associated properties. Each residual may be associated with this set of properties which may be based on values of nearby pixels. These properties are used to cluster the residuals based on statistical similarity. Prior techniques used a predetermined and fixed set of properties. However, embodiments dynamically select the best performing properties to be used for context modeling, which further improves the compression performance.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 3 illustrates a diagram of an example of a first block-based prediction strategy in accordance with one or more embodiments;

DETAILED DESCRIPTION

One or more embodiments of the present disclosure include an image compression system which provides block-based improvements for lossless image compression. Lossless image compression includes various data compression techniques which enable the original data to be perfectly recovered from corresponding compressed data. For image data, this means that the original image can be reconstructed pixel-accurate from the compressed data. Improved compression techniques provide various benefits for service providers and users. For example, more images can be stored per unit disk space using more efficient compression techniques, allowing existing resources to be more efficiently utilized (by both service providers and users). Additionally, the latency to upload/download remote compressed files is reduced due to smaller file sizes. Likewise, the cost of network I/O operations are also reduced as less data needs to be transmitted due to smaller file sizes.

Lossless image compression can be implemented in a variety of ways. For example, a prediction model may be used to predict the value of a current pixel based on other pixels in the image that have been processed. A residual (e.g., the difference between the predicted pixel value and the actual pixel value) is then computed for each pixel in the image. The residual data is entropy coded to lossless compress the image data. Embodiments improve upon such lossless image compression techniques. For example, each image may be divided into a plurality of blocks (e.g., N×N regions of pixels). Rather than selecting a predictor for an entire image, as in prior techniques, a best predictor can be determined for each block. Since each block represents a relatively small number of pixels, the best predictor for each block results in predicted values that are much closer to the actual pixel values. Since the prediction is improved, the number of bits needed to represent the residual data is reduced, improving the overall compression. Additionally, to reduce the amount of communication overhead introduced to signal the predictor for each block, embodiments can use block strategies that define when the same predictor can be used for a block across multiple planes (e.g., R-G-B or Y-Co-Cg).

Next, embodiments perform a machine learning-based context modeling to group residuals having similar properties. Prior techniques have used a static set of properties (also referred to herein as "features") when context modeling. However, for any given image, or block, some of these properties might be more useful (e.g., produce better compression results) than others, or one set of properties may produce better results than a different set of properties. Accordingly, unlike prior techniques, embodiments dynamically select a set of properties for each color plane, block, or pixel to be used for ML-based context modeling to improve overall compression.

Figure 1:
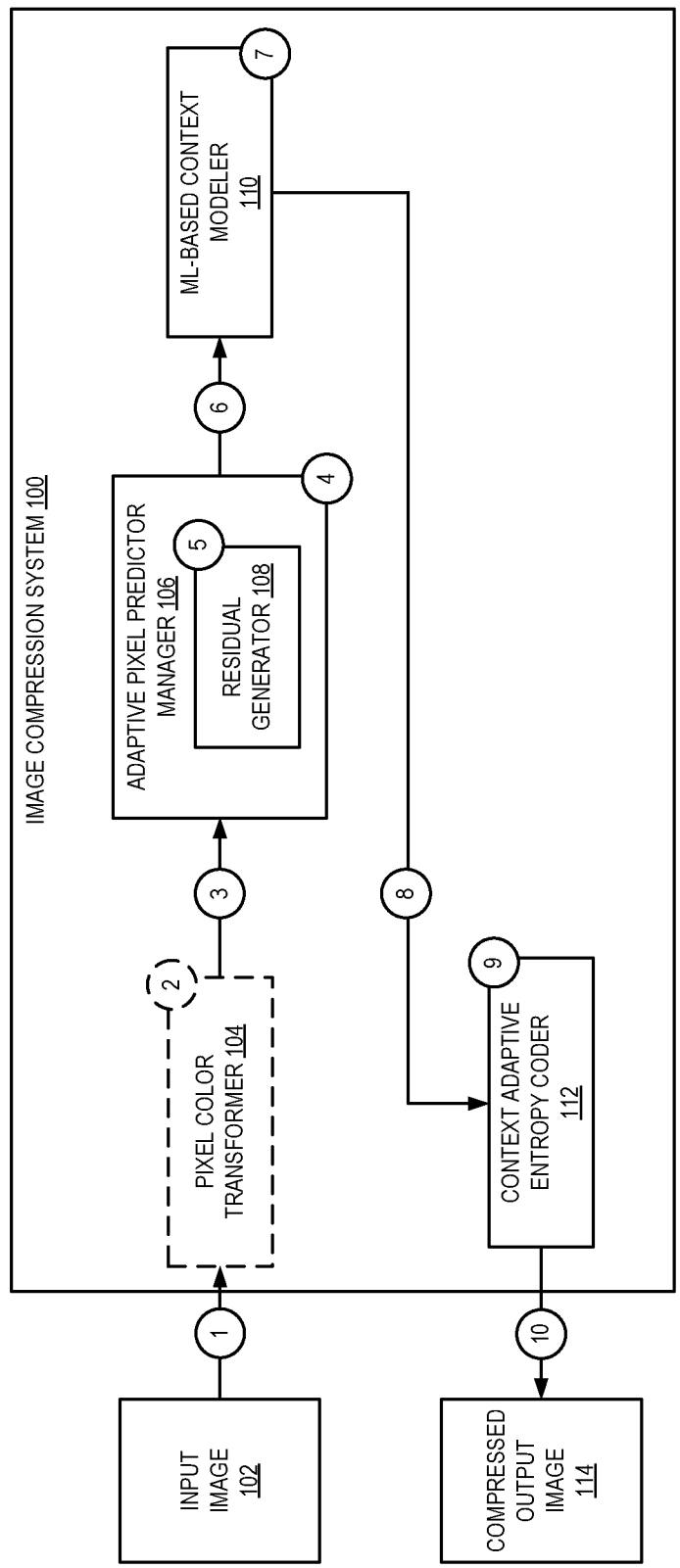
FIG. 1 illustrates a diagram of a process of learned lossless image compression using block-based prediction and context adaptive entropy coding in accordance with one or more embodiments.

FIG. 1 illustrates a diagram of a process of learned lossless image compression using block-based prediction and context adaptive entropy coding in accordance with one or more embodiments. As shown in FIG. 1, an image compression system 100 can receive an input image 102 at numeral 1. In various embodiments, the image compression system 100 can be implemented as part of an image management application, digital design application, or in any application that allows delivery of content to users and/or storage of content by users. In some embodiments, the image compression system 100 can be implemented as part of a hardware or software coder/decoder (codec). Depending on the embodiment, the input image 102 can comprise any type of digital visual media. As used herein, the term "digital visual media" refers to digital data capable of producing a visual representation. For instance, the term "digital visual media" includes digital images and digital video. As used herein, the term "digital image" refers to any digital symbol, picture, icon, or illustration.

Optionally, the image compression system can include pixel color transformer 104. Pixel color transformer 104 can transform the color space of the input image 102, at numeral 2. For example, the color space may be transformed from RGB(A) to YCoCg(A) for better color decorrelation. At numeral 3, the transformed input image can be provided to adaptive pixel predictor manager 106. Alternatively, if the input image 102 is not transformed, at numeral 3 the original input image 102 is provided to adaptive pixel predictor manager 106. As discussed, typically a predictor is chosen for an image, or a color plane of the image, from among a plurality of available predictors. However, this may result in less-than-ideal predictions, as some predictors may perform better in some portions of the input image than others.

Accordingly, embodiments first divide the input image 102 into a plurality of blocks, where each block represents a portion of the input image. In some embodiments, the input image may be evenly divided into a set number of blocks. Alternatively, the image may be divided into a variable number of blocks, depending on the size of the input image. In some embodiments, each block may represent an equal size portion of the input image. Alternatively, the size of each block may vary. Similarly, in some embodiments, each block may represent a contiguous portion of the input image. Alternatively, the blocks may be noncontiguous but constrained such that any given pixel belongs to only one block.

A predictor is then assigned to each block of the input image. For example, the predictor that results in the lowest average residual may be assigned to each block. Depending on the number of available predictors and the number of blocks in an image, each block may be associated with a different predictor. In some embodiments, multiple blocks may use the same predictor. At numeral 4, the adaptive pixel predictor manager 106 can then use the assigned predictors to generate a "predicted" version of the input image. Residual generator 108 can then use the predicted version and the input image 102 to compute the residual values of the pixels, at numeral 5. For example, given a pixel P, neighboring pixels are used and combined using an algorithm to create a prediction of pixel P, called P'. The residual value R is then computed as the difference between P and P'. Intuitively, better compression performance can be obtained when all the residual values are very close to 0, i.e., when the prediction is very accurate. As discussed, each residual value is associated with a set of "properties" (i.e., features), which are also based on a combination of the neighboring pixels. The residual data and corresponding properties are provided to machine learning (ML)-based context modeler 110, at numeral 6.

The ML-based context modeler 110 uses a context-adaptive strategy to entropy code the residuals. In the third step, called context modeling, an ML algorithm automatically generates a set of contexts in such a way that residuals with similar statistical properties are encoded together. Encoding all the residuals together (e.g., employing one single context) does not perform the best since residuals might present different statistical properties. Residuals/pixels can therefore be assigned to different contexts to improve compression efficiency. As discussed, in prior techniques the contexts definition is static and fixed. However, embodiments may use a machine learning algorithm to find the best contexts to use for a given image. As discussed, embodiments select one or more features that lead to the best compression performance. These features are then used by the ML-based context modeler 110 to perform context modeling in which pixels are clustered according to their features, at numeral 7. As used herein, a context may refer to a particular combination of the residual properties (e.g., all pixels whose property P1 is greater than a certain value are considered to be part of the same context).

These contexts (e.g., clusters of pixels having similar properties) may then be provided to a context adaptive entropy coder 112 (such as an adaptive arithmetic coder) at numeral 8. All pixels belonging to the same context are entropy coded together (e.g., using an adaptive coding algorithm), at numeral 9. The resulting compressed output image 114 can then be returned at numeral 10. For example, the compressed output image 114 can be stored to a user-specified or system-specified location (e.g., locally on a user device, remotely on a storage location of a storage service or other cloud-based service).

Figure 2:
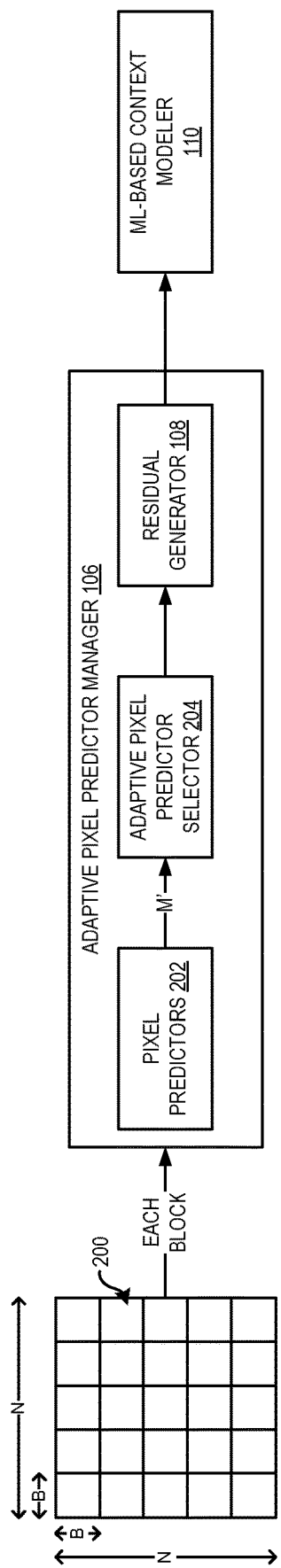
FIG. 2 illustrates a diagram of block-based prediction and residual generation in accordance with one or more embodiments.

FIG. 2 illustrates a diagram of block-based prediction and residual generation in accordance with one or more embodiments. As previously mentioned, better pixel prediction ultimately results in better compression performance. Given a set of possible pixel predictors, it should therefore be desirable to employ as many predictors as possible, as this would help in keeping the residual values as close to zero as possible. Nevertheless, this would introduce a non-negligible communication overhead, as it would now be required to communicate, for each pixel, what predictor has been used. To overcome this problem while still guaranteeing a sufficient level of granularity in the predictor selection, embodiments adopt a block-based approach. As shown in FIG. 2, an input image can be divided into a plurality of blocks 200. For example, the input image can be divided into N-by-N blocks, each block including B-by-B pixels. Although regularly shaped, contiguous blocks are shown in the example of FIG. 2, as discussed, the block size and number of blocks may vary. In some embodiments, the blocks may be noncontiguous.

Each pixel predictor 202 may define a different way of calculating a predicted value of a current pixel based on nearby pixels and/or combinations of nearby pixel values. For example, one predictor may determine the predicted pixel value by combining (e.g., adding and/or subtracting) the values of adjacent pixels (e.g., a top pixel, a bottom pixel, a left pixel, a top left pixel, a bottom left pixel, a top top pixel, etc.). A predictor may determine an average (e.g., median or mean) value of multiple nearby pixels or combinations of nearby pixel values. Various pixel predictors as are known may be used in various embodiments, such as those provided by the Free Lossless Image Format (FLIF) specification, or other image format specifications.

In various embodiments, a subset of the pixel predictors 202, M', may be chosen from to identify the best pixel predictor for a given block. The size of M' (e.g., the number of pixel predictors included in M') may vary depending on the compression performance/communication overhead desired in a particular implementation. Adaptive pixel predictor selector 204 can assign a pixel predictor to each block from the subset of pixel predictors, M', based on which pixel predictor performs best according to a chosen metric (e.g., the average number of bits necessary to express the residual value). Once each block has been assigned a pixel predictor by adaptive pixel predictor selector 204, the residual generator 108 can generate the residuals and associated properties for the entire image by comparing the predicted pixel values to the actual pixel values. The residuals and associated properties can then be provided to ML-based context modeler 110 to perform the context modeling steps of the compression pipeline.

As discussed, increasing the number of available pixel predictors allows for better pixel predictions. However, this also increases the communication overhead, which can overwhelm the savings obtained from compression. For example, assuming the image is comprised of N different color planes, this approach would result in associating N predictors for each block (e.g., one from each color plane), which can still be expensive to communicate. Assuming the pixel predictor is chosen from a set of M possible pixel predictors, this approach would require (in the worst possible case) to communicate log 2(M)×N bits per block. To overcome this potential problem, embodiments utilize a set of block-related strategies to approach the performance of the ideal case of N predictors per block, while reducing the communication overhead.

FIG. 3 illustrates a diagram of an example of a first block-based prediction strategy in accordance with one or more embodiments. As shown in FIG. 3, an image may be comprised of three color planes: Y 300, Co 302, and Cg 304. In some embodiments, the image may be comprised of more or fewer color planes (e.g., adding an alpha plane, removing a color plane, etc.) or may be comprised of different color planes (e.g., R, G, B, color planes, etc.). In the example of FIG. 3, a subset of the total possible pixel predictors is used to select pixels for the blocks. As shown, the subset of pixel predictors includes pixel predictors 0, 1, 2, and 3. As discussed, these pixel predictors can include any pixel predictor that predicts a pixel's value based on the values of neighboring pixels, such as pixel predictors that are generally known in the art. In some embodiments, the subset of pixel predictors is those resulting in the lowest amount of bits-per-pixel (bpp)—which is computed starting from the number of bits necessary to express the residual values of the pixels. In other embodiments, other metrics are used to determine the subset of pixels, such as the mean squared error. Second, the number of predictors that can be associated to each block is limited (e.g., one predictor per block). This means that we are using the same pixel predictor for blocks on different planes, as shown in FIG. 3.

In this scenario, the amount of overhead communication is limited to log 2(M')×n bits per block, where M' is the number of selected predictors to choose from and n is the number of predictors per block. Since each block is limited to one predictor, the overhead communication is limited to log 2(M').

Figure 4:
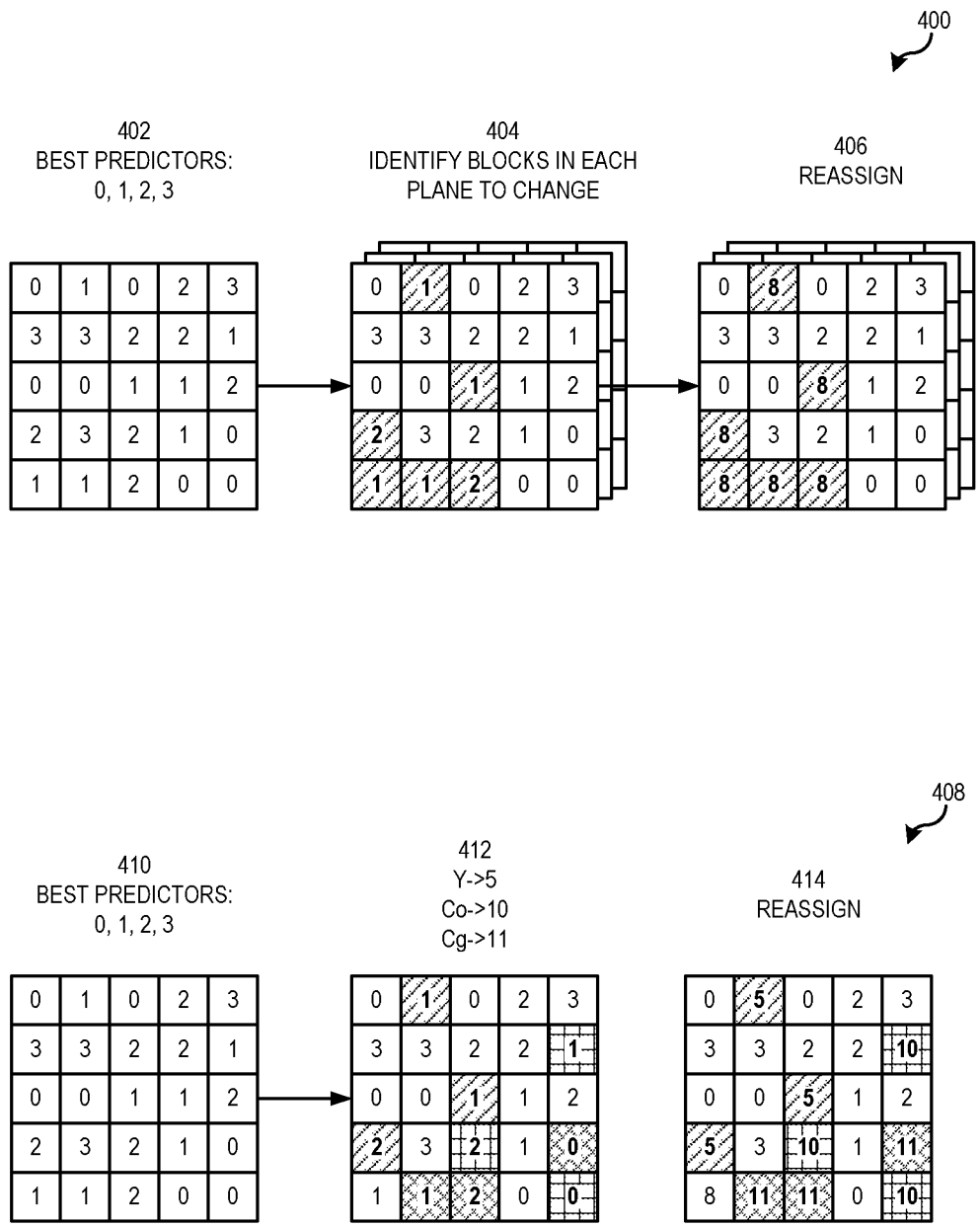
FIG. 4 illustrates a diagram of additional examples of block-based prediction strategies in accordance with one or more embodiments.

FIG. 4 illustrates a diagram of additional examples of block-based prediction strategies in accordance with one or more embodiments. As shown in FIG. 4, additional block-based prediction strategies can potentially improve on the compression performance of the first block-based prediction strategy described above with respect to FIG. 3. For example, rather than limiting each block to a single predictor across all color planes, in some embodiments these block-based prediction strategies allow a subset of blocks to be reassigned to a different predictor to improve compression performance.

For example, there may be a fraction of the blocks where compression performance can be improved by reassigning only these blocks to a different predictor. Accordingly, in a second block-based prediction strategy 400, the subset of best performing predictors 402 can be assigned to the blocks of the input image. As in the first strategy described above, the same predictor can be applied to the same block in each color plane. A portion of the blocks in each color plane can then be identified for reassignment. For example, a threshold number of blocks (e.g., 10-15% of blocks in each color plane, or other threshold number of blocks) for which reassignment would be most beneficial are identified. In some embodiments, the threshold number of blocks may be set automatically based on available resources (e.g., disk space, bandwidth, etc.), or may be configurable by the user or other entity. As shown in FIG. 4, these blocks are shown hatched. These may include the blocks for which a new predictor results in the largest reduction of bits necessary to express the residual values or may be selected based on other metrics. These blocks are then reassigned 406 to a new predictor. The new predictor may include any available predictor. In this second strategy, each plane is treated independently. As a result, some blocks may share the same predictor across all color planes, some blocks may include different predictors in one or more color planes, and some blocks may include a different predictor in each color plane.

This introduces an additional overhead compared to the first strategy discussed above with respect to FIG. 3, since now it needs to be communicated which blocks are different. The amount of communication overhead required by this second strategy 400 can be broken down in the following components: log 2(M')×n bits per block, 1 bit per block (to communicate whether the block predictor has been reassigned or not), and fraction_blocks_recomputed×num_planes bits per block (to communicate which block belonging to which plane has been recomputed). As an example, assume there are four possible predictors, the image has 3 planes, and the predictor is recomputed for 10% of the blocks, for each plane. The communication overhead would be (in the worst possible scenario):

log 2(4)×1=2 bits per block to communicate the original 4 predictors.

1 bit per block to communicate whether a block has been recomputed.

3 bits for 30% of the blocks, to communicate which block has been re-assigned.

Total: 2+1+0.3*3=3.9 bits per block (worst case).

An alternative variation is shown in strategy 3 408. In the third strategy, once again a subset of predictors is selected 410. In this example, the same four predictors are selected as in the second strategy 400. Unlike the second strategy, where each color plane is independent, in the third strategy blocks are selected to have their predictor reassigned so that the re-computed blocks are mutually exclusive across planes. For example, if a block is reassigned its predictor in the Y plane, then it cannot be reassigned in the Co or Cg planes.

After the initial assignment is completed, the blocks that would benefit the most from a predictor re-computation are identified. Unlike the second strategy, in the third strategy a block can only be re-assigned for one plane. For example, as shown at 412, three blocks are identified in the Y plane, three different blocks are identified for the Co plane, and three still different blocks are identified for the Cg plane. These identified blocks are then reassigned 414 accordingly. The communication overhead for strategy three can be computed as in the following:

M' symbols needed to communicate the original predictors.

num_planes symbols to communicate the new predictor.

Total: log 2(M'+num_planes) bits per block.

By following the same example described above, the cost becomes:

M'=4 (e.g., number of predictors), and num_planes=3.

log 2(4+3)=3 bits per block.

Optionally, the unused symbol can be used for an additional predictor.

Figure 5:
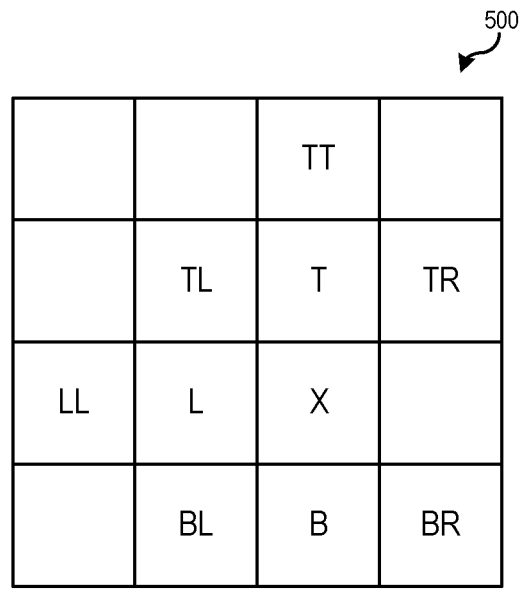
FIG. 5 illustrates a diagram of example context properties in accordance with one or more embodiments.

FIG. 5 illustrates a diagram of example context properties in accordance with one or more embodiments. As shown in FIG. 5, the context properties associated with a given pixel can be based on the values of nearby pixels. For example, as shown at 500, values of nearby pixels top top (TT), top left (TL), top (T), top right (TR), left left (LL), left (L), bottom left (BL), bottom (B), and bottom right (BR), can all be used to determine properties associated with a current pixel, X. More or fewer nearby pixels may be available, depending on the underlying compression algorithm being extended. The number of properties, and the definitions of those properties, may vary depending on the compression algorithm in use. For example, in the FLIF algorithm (interlaced mode), each residual value is associated with 8 to 11 properties (depending on the plane). Alternatively, other compression algorithms may be similarly extended. These properties are used to build a model that allows different contexts to be created. All pixels belonging to the same context can be encoded together by the same entropy coder.

As shown at 502, the properties may include a median index 504, a luma prediction miss 506, the value of T-B 508, prediction miss 510, predicted value of pixel X 512, and the values TT-T, LL-L 514. Although the example properties shown in FIG. 5 are derived from FLIF, in alternative embodiments different properties may be used depending on the compression algorithm being extended. As these properties are derived from FLIF, which does not utilize blocks, not all properties necessarily contribute to improved compression results when used in a block-based compression scheme. As such, in various embodiments, one or more properties may be excluded from context modeling to improve compression performance. For example, the median index property brings almost no contribution to compression for the block-based approach. While removing a property is detrimental in most cases in the original FLIF implementation, the same is not true for the block-based embodiments described herein. Experimentally, it was determined that removing some of the properties (e.g., luma miss and prediction miss, respectively) can provide consistent improvements in performance (up to 5-7%) compared to standard context. The properties that are included or excluded can vary from image to image and once determined may be indicated as part of image metadata.

Figure 6:
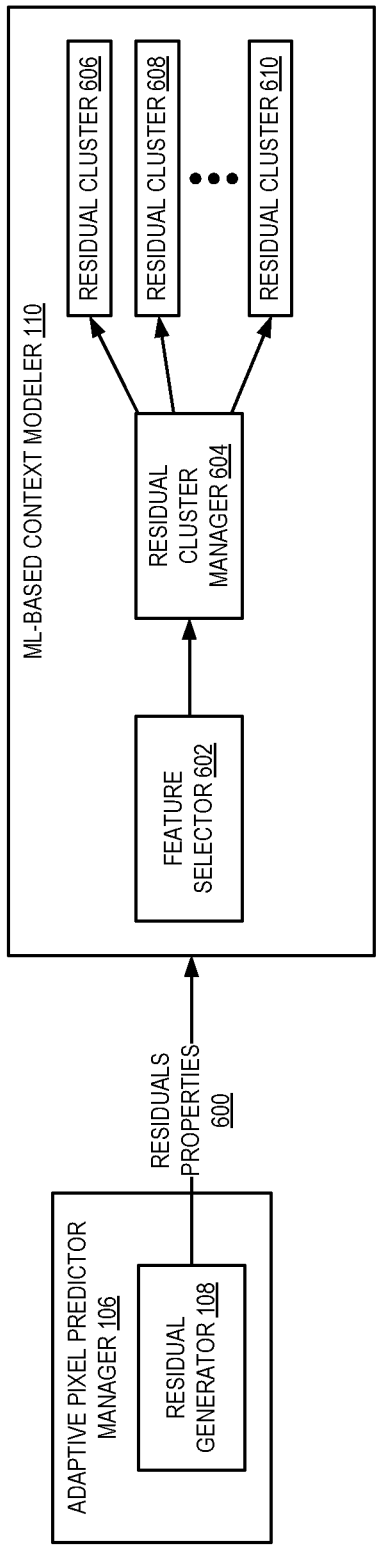
FIG. 6 illustrates a diagram of machine learning-based context modeling in accordance with one or more embodiments.

FIG. 6 illustrates a diagram of machine learning-based context modeling in accordance with one or more embodiments. The block-based strategies described above can effectively improve compression by improving the overall prediction accuracy. Together with this, we are also interested in improving the ML-based context modeling step. As previously mentioned, a ML algorithm is used to find the right number of contexts where to encode the pixels. This modeling is performed starting from a set of properties, that are used by the ML algorithm as features to cluster groups of pixels exhibiting similar statistical properties that make them suitable to be encoded together by entropy coding.

Unlike traditional lossless image compression pipelines, where the set of properties to be used are usually predetermined and fixed, embodiments instead change the set of properties per image or per plane. This enables a better context modeling process that can be carried out by the ML algorithm. In some embodiments, feature selector 602 can identify which properties are to be used for context modeling. In some embodiments, feature selector 602 can analyze a smaller, representative version of the whole input image. This can be obtained by sub-sampling the image or, in the case of an interlaced pixel scanning order (such as an in Adam7 employed by PNG), by considering a lower resolution scan of the image. Once this representative version of the image is obtained, feature selector 602 can select the context properties that result in the best compression results.

Alternatively, in some embodiments, the feature selector 602 can include a machine learning model, such as a neural network, which has been trained to identify properties to be used for context modeling based on an input image. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning. In some embodiments, the input image may be the representative version of the image or may be the whole input image. that utilizes a set of algorithms to attempt to model high-level abstractions in data.

Once the properties that are to be used to perform context modeling have been identified, residual cluster manager 604 can then group the residuals into a plurality of clusters 606-610 according to the statistical properties of those pixels. In some embodiments, residual cluster manager 604 can implement a decision tree machine learning model. As discussed, each pixel residual is associated with a set of N properties (e.g., N features) that are used to cluster the pixels in different contexts. The context tree includes two different types of nodes: decision nodes, which are used to route the pixel residuals based on the value of the properties of the context, and leaf nodes, where pixel residuals are encoded. The leaf nodes themselves can become decision nodes at any point, if splitting results in better compression, which is continuously computed within the virtual contexts, as the pixels are encoded in scanning order. N virtual contexts are maintained in each leaf node, one for each property of the context associated with the pixel residual, so that the leaf node can be converted into a decision node when the virtual contexts show that splitting the node would result in better compression performance. The performance of each virtual context is computed by storing the number of bits necessary to represent the residuals belonging to that virtual context (e.g., by operating as if the leaf node is already split).

At the end of the clustering by residual cluster manager 604, a set of residual clusters 606-610 is produced. These clusters can be provided to the entropy coder to encode the residuals. Using feature selection, as discussed, improves compression performance. This is particularly important where the residuals are biased toward zero (e.g., where predictions are very accurate). In some embodiments, this context selection can be performed on any residual values, regardless of the techniques used to obtain them. In some embodiments, in addition to different images having different feature sets, the feature selector may be configured to select features for each block. For example, one block of an image may have one set of features used to cluster residuals associated with that block, while a different block may have a different set of features.

Figure 7:
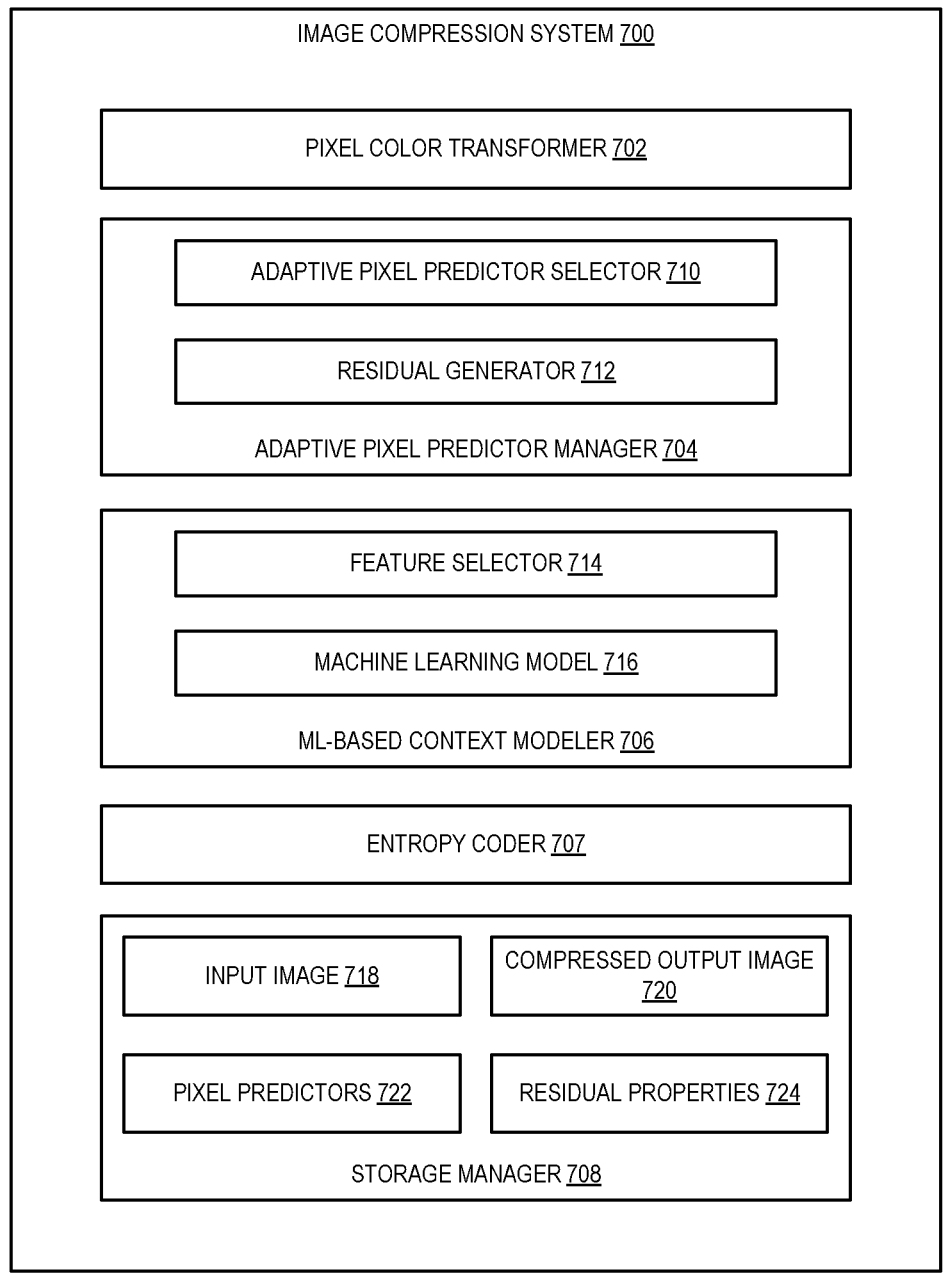
FIG. 7 illustrates a schematic diagram of image compression system in accordance with one or more embodiments.

FIG. 7 illustrates a schematic diagram of an image compression system (e.g., "image compression system" described above) in accordance with one or more embodiments. As shown, the image compression system 700 may include, but is not limited to, pixel color transformer 702, adaptive pixel predictor manager 704, ML-based context modeler 706, entropy coder 707, and storage manager 708. The adaptive pixel predictor manager 704 includes an adaptive pixel predictor selector 710 and a residual generator 712. The ML-based context modeler 706 includes a feature selector 714 and a machine learning model 716. The storage manager 708 includes input image 718, compressed output image 720, pixel predictors 722, and residual properties 724.

As illustrated in FIG. 7, the image compression system 700 includes a pixel color transformer 702. As discussed, pixel color transformer 702 can transform an input image from an input color space to an output color space. For example, the pixel color transformer 702 can implement one or more transformation matrices to transform the color model of the input image. This may include a transformation matrix to transform an input RGB image to a YCoCg image. In various embodiments, the pixel color transformer 702 may support additional color transforms, depending on implementation.

As further illustrated in FIG. 7, the image compression system 700 may further include adaptive pixel predictor manager 704. The adaptive pixel predictor manager 704 can divide an input image into a plurality of blocks. As discussed, the blocks may include regularly sized (e.g., B-by-B pixel) blocks and an input image may include N-by-N blocks. Alternatively, blocks may be irregularly sized and may or may not be contiguous. The adaptive pixel predictor manager 704 may include adaptive pixel predictor selector 710 and residual generator 712. The adaptive pixel predictor selector 710 can identify, for a given image, a subset of pixel predictors 722 which are to be used for each block of the input image. Each pixel predictor may define a different way of predicting the value of a current pixel based on the values (or combination of values) of nearby pixels.

Adaptive pixel predictor selector can assign a best performing predictor to each block according to one or more block-based strategies. For example, a block may be assigned the same predictor across all color planes. In some embodiments, a portion of the blocks in any or each color plane may be reassigned to a different predictor based on an improvement in compression performance. For example, a portion of the blocks in each color plane (e.g., 10-15% of the blocks, or other threshold value) may be reassigned to a different pixel predictor that results in improved compression performance. In some embodiments, each color plane can be reassigned independently, or the reassignments may be made in such a way that if a block in one color plane is reassigned then the corresponding block in other color planes cannot be reassigned. Once the predictors have been assigned, residual generator 712 can compute the residuals and residual properties 724 for all of the pixels in the input image. As discussed, the residuals represent a difference between the predicted values of the pixels and the actual values of the pixels. The residuals and residual properties are then passed to ML-based context modeler 706 to perform context modeling.

As further illustrated in FIG. 7, the image compression system 700 may further include ML-based context modeler 706. The ML-based context modeler 706 may perform context modeling on the residuals such that residuals having similar statistical properties are grouped (e.g., clustered) together. In some embodiments, ML-based context modeler 706 can include a feature selector 714 and a machine learning model 716. Unlike traditional systems which rely on static or hardcoded residual properties for context modeling, embodiments can dynamically select which properties (e.g., features) are to be used to perform context modeling. For example, feature selector 714 can analyze a smaller, representative version of the whole input image. As discussed, in some embodiments this can be obtained by sub-sampling the image or by considering a lower resolution scan of the image. Alternatively, other techniques can be used to obtain the representative version of the input image. For example, in some embodiments, a machine learning algorithm may be used to perform feature selection. In some embodiments, a downsampled version of the image or the whole image is provided to the machine learning algorithm and the machine learning algorithm then automatically selects one or more features to be used. For example, the machine learning algorithm may include a deep neural network, whose input is the image or image plane, and whose output is a binary decision on which features to use for compression. In some embodiments, the machine learning algorithm is trained to predict the one or more features that result in the best compression performance. This enables feature selection to be performed without directly computing the compression performance. Once this representative version of the image is obtained, feature selector 714 can select the context properties that result in the best compression results.

Once the features to be used for context modeling have been selected, the machine learning model 716 can cluster the residuals into groups based on their statistical properties. As discussed, the machine learning model may be a decision tree model (such as that implemented by a residual cluster manager 604 discussed above) can include two different types of nodes: decision nodes, which are used to route the pixel residuals based on the value of the properties of the context, and leaf nodes, where pixel residuals are encoded. At the end of the clustering by the machine learning model 716, a set of residual clusters is produced. These clusters can be provided to the entropy coder 707 to encode the residuals. As discussed, the entropy coder can include an adaptive arithmetic coder or other entropy coder as is known in the art.

As illustrated in FIG. 7, the image compression system 700 also includes the storage manager 708. The storage manager 708 maintains data for the image compression system 700. The storage manager 708 can maintain data of any type, size, or kind as necessary to perform the functions of the image compression system 700. The storage manager 708, as shown in FIG. 7, includes the input image 718, compressed output image 720, pixel predictors 722, and residual properties 724.

As further illustrated in FIG. 7, the storage manager 708 also includes input image data 718. Input image data 718 can include information for any digital image utilized by the image compression system 700. For example, input image data 718 includes a digital image, digital video, or any other digital visual media. The storage manager 708 may also include compressed output image data 720. This may include the encoded residual information generated by entropy coder 707 and any other information needed to reconstruct the original image. The storage manager 708 may also include pixel predictors 722. As discussed, the pixel predictors may each define a different way of predicting the value of a current pixel based on the values of nearby pixels. Similarly, the storage manager 708 may also include residual properties 724, which may each define a different property of a residual based on the values of nearby pixels. The pixel predictors and residual properties may vary depending on the underlying compression technique(s) used in a given embodiment. For example, when extending FLIF, embodiments may include pixel predictors and residual properties utilized by FLIF.

Each of the components 702-708 of the image compression system 700 and their corresponding elements (as shown in FIG. 7) may be in communication with one another using any suitable communication technologies. It will be recognized that although components 702-708 and their corresponding elements are shown to be separate in FIG. 7, any of components 702-708 and their corresponding elements may be combined into fewer components, such as into a single facility or module, divided into more components, or configured into different components as may serve a particular embodiment.

The components 702-708 and their corresponding elements can comprise software, hardware, or both. For example, the components 702-708 and their corresponding elements can comprise one or more instructions stored on a computer-readable storage medium and executable by processors of one or more computing devices. When executed by the one or more processors, the computer-executable instructions of the image compression system 700 can cause a client device and/or a server device to perform the methods described herein. Alternatively, the components 702-708 and their corresponding elements can comprise hardware, such as a special purpose processing device to perform a certain function or group of functions. Additionally, the components 702-708 and their corresponding elements can comprise a combination of computer-executable instructions and hardware.

Furthermore, the components 702-708 of the image compression system 700 may, for example, be implemented as one or more stand-alone applications, as one or more modules of an application, as one or more plug-ins, as one or more library functions or functions that may be called by other applications, and/or as a cloud-computing model. Thus, the components 702-708 of the image compression system 700 may be implemented as a stand-alone application, such as a desktop or mobile application. Furthermore, the components 702-708 of the image compression system 700 may be implemented as one or more web-based applications hosted on a remote server. Alternatively, or additionally, the components of the image compression system 700 may be implemented in a suit of mobile device applications or "apps." To illustrate, the components of the image compression system 700 may be implemented in an application, including but not limited to ADOBE® ILLUSTRATOR®, ADOBE PHOTOSHOP®, ADOBE® CREATIVE CLOUD® software. "ADOBE," "ILLUSTRATOR," "PHOTOSHOP," and "CREATIVE CLOUD" are either registered trademarks or trademarks of Adobe Systems Incorporated in the United States and/or other countries.

Figure 8:
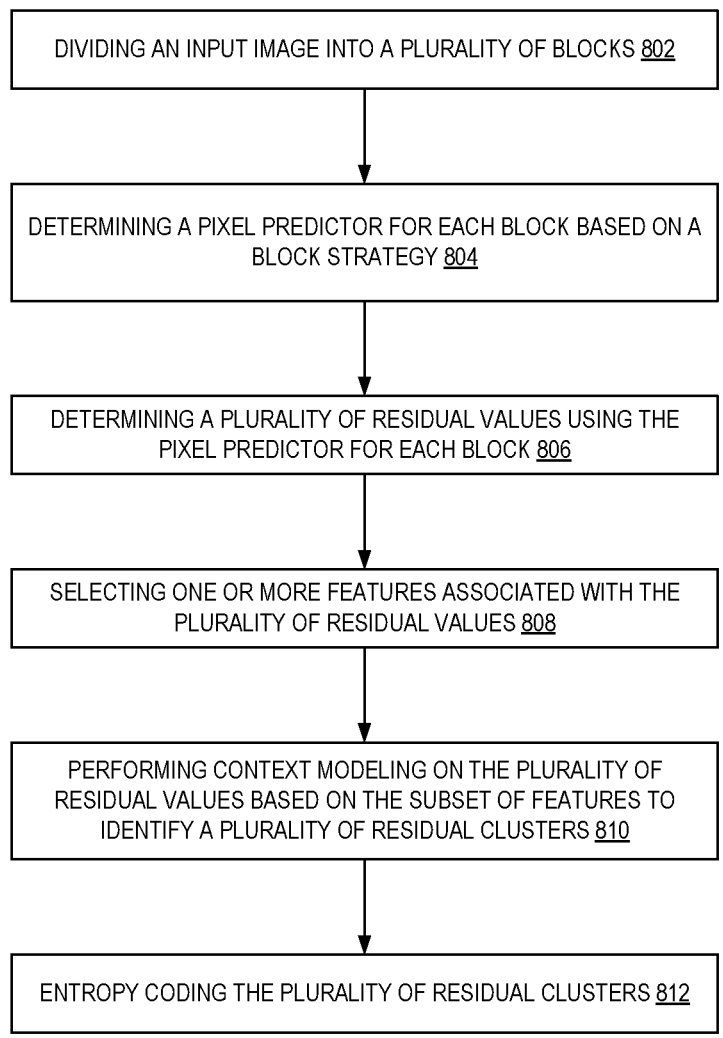
FIG. 8 illustrates a flowchart of a series of acts in a method of learned lossless image compression using block-based prediction and context adaptive entropy coding in accordance with one or more embodiments.

FIGS. 1-7, the corresponding text, and the examples, provide a number of different systems and devices that allows a user to facilitate selection of target individuals within digital visual media. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of learned lossless image compression using block-based prediction and context adaptive entropy coding in accordance with one or more embodiments. In one or more embodiments, the method 800 is performed in a digital medium environment that includes the image compression system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of dividing an input image into a plurality of blocks. As discussed, an input image may be divided into a plurality of regularly shaped blocks (e.g., B-by-B pixel sized blocks). Alternatively, the blocks may be irregularly shaped and/or may be noncontiguous. The method 800 further includes an act 804 of determining a pixel predictor for each block based on a block strategy. By dividing the image into blocks, predictors can be selected for smaller portions of the input image, resulting in more accurate pixel predictions. The reduces the size of residual values and improves compression performance.

In some embodiments, the block strategy is to assign a same pixel predictor to a same block in each color plane. For example, the image may include Y, Co, and Cg color planes. When the image is divided into blocks, each plane is divided blocks. As a result, a given block in one plane has corresponding blocks in the other planes. By restricting each block to one predictor (e.g., a given block has the same predictor in all color planes), the communication overhead is reduced. In some embodiments, the block strategy is further to reassign a subset of blocks in each color plane to a new pixel predictor based on compression performance. Although the best performing predictor may often be common for a block across color planes, this does not always hold true. As such, compression performance may improve for some blocks in some color planes by reassigning the pixel predictor to a different pixel predictor. In some embodiments, the number of blocks that may be reassigned in a given color plane may be limited to a threshold number of blocks (e.g., 10-15% of blocks in a given color plane). In some embodiments, if a block is reassigned in one color plane to the new pixel predictor then the block is not reassigned in any other color plane. As such, if a block is reassigned in one color plane, it cannot be assigned in any other color plane. Additionally, as discussed, selecting a pixel predictor from a large number of pixel predictors allows for more accurate pixel predictions to be made. However, this also increases communication overhead. Accordingly, in some embodiments, the pixel predictor is selected from a subset of available pixel predictors and wherein the new pixel predictor is selected from the available pixel predictors.

The method 800 further includes an act 806 of determining a plurality of residual values using the pixel predictor for each block. As discussed, the residual values represent the difference between the predicted value of a pixel and that pixel's actual value. As such, once each block has been assigned a pixel predictor, the predicted pixel values can be generated and compared to the original pixel values to determine the residual values.

The method 800 further includes an act 807 of selecting a subset of features associated with the plurality of residual values. As discussed, each residual can be associated with a plurality of features (also referred to as properties). Each feature may be based on nearby pixel values or combinations of nearby pixel values. Not all of these features are necessarily helpful during compression (e.g., by removing some of the features during context modeling, the compression performance may improve). In some embodiments, selecting the subset of features can include determining compression performance on a representative version of the input image using different subsets of the features, and selecting the subset of the features having a highest compression performance resulting in a largest reduction in file size.

The method 800 further includes an act 810 of performing context modeling on the plurality of residual values based on the subset of features to identify a plurality of residual clusters. In some embodiments, context modeling can include providing the plurality of residual values and the subset of features to a decision tree model, wherein the decision tree model identifies the plurality of residual clusters based on the subset of features.

The method 800 further includes an act 812 of entropy coding the plurality of residual clusters. In some embodiments, the entropy coder can include an adaptive arithmetic entropy coder.

Figure 9:
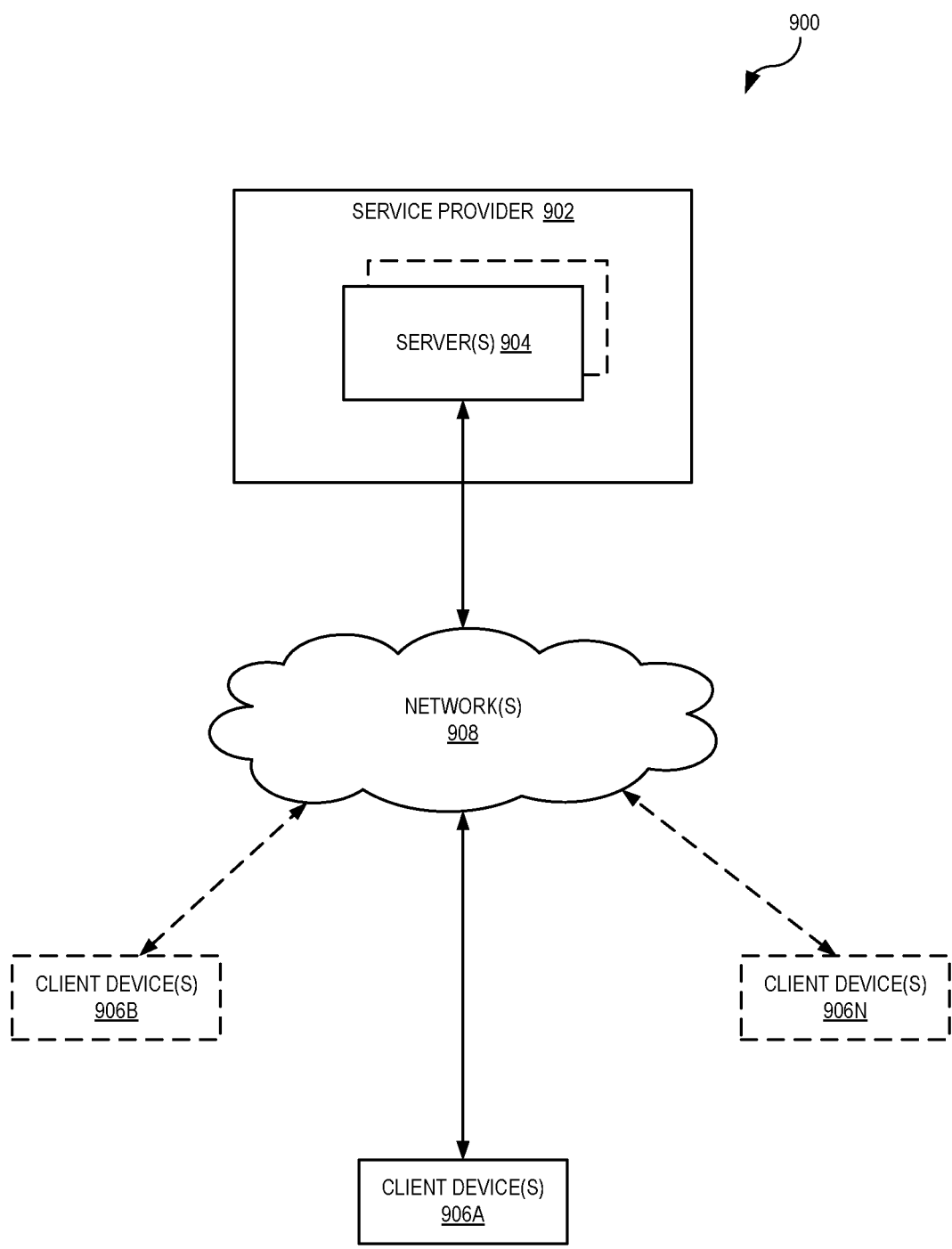
FIG. 9 illustrates a schematic diagram of an exemplary environment in which the image processing system can operate in accordance with one or more embodiments.

FIG. 9 illustrates a schematic diagram of an exemplary environment 900 in which the image compression system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the image compression system 700. In particular, the image compression system 700 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 10. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa.

The one or more networks 908 will be discussed in more detail below with regard to FIG. 10.

In addition, the environment 900 may also include one or more servers 904. The one or more servers 904 may generate, store, receive, and transmit any type of data, including input image data 718, compressed output image data 720, pixel predictors 722, residual properties 724, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the image compression system 700. In particular, the image compression system 700 can comprise an application running on the one or more servers 904 or a portion of the image compression system 700 can be downloaded from the one or more servers 904. For example, the image compression system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 can provide access to one or more digital images (e.g., the input image data 718, such as camera roll or an individual's personal photos) stored at the one or more servers 904. Moreover, the client device 906A can receive a request (i.e., via user input) to compress and input image and provide the request to the one or more servers 904. Upon receiving the request, the one or more servers 904 can automatically perform the methods and processes described above to compress the input image. The one or more servers 904 can return the compressed output image to the client device 906A, store the compressed output image to a storage location and return an identifier (e.g., URL or other endpoint) through which the compressed output image can be accessed to the client device, etc.

As just described, the image compression system 700 may be implemented in whole, or in part, by the individual elements 902-908 of the environment 900. It will be appreciated that although certain components of the image compression system 700 are described in the previous examples with regard to particular elements of the environment 900, various alternative implementations are possible. For instance, in one or more embodiments, the image compression system 700 is implemented on any of the client devices 906A-N. Similarly, in one or more embodiments, the image compression system 700 may be implemented on the one or more servers 904. Moreover, different components and functions of the image compression system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
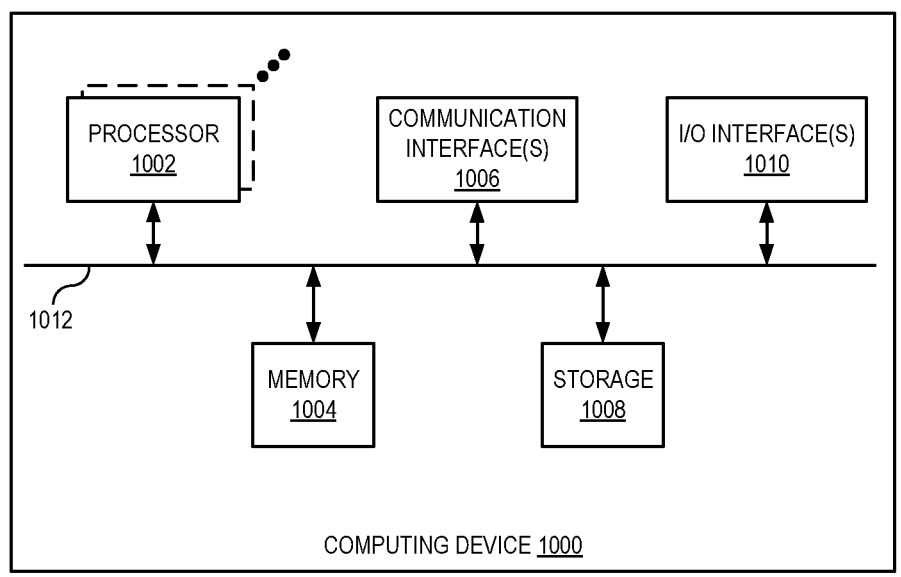
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the image processing system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   dividing an input image into a plurality of blocks;
   determining a pixel predictor for each block based on a block strategy that assigns the pixel predictor to each color plane in a block of the plurality of blocks;
   determining a plurality of residual values using the pixel predictor for each block;
   selecting a plurality of features associated with the plurality of residual values wherein selecting the plurality features associated with the plurality of residual values, further comprises:
   determining compression performance on a smaller version of the input image using a first subset of the features of the plurality of features and a second subset of features of the plurality of features;
   comparing the compression performance of the first subset and the compression performance of the second subset; and
   selecting the first subset or the second subset based on the highest compression performance resulting in a largest reduction in file size;
   performing context modeling on the plurality of residual values based on the selected subset to identify a plurality of residual clusters; and
   entropy coding the plurality of residual clusters.

2. The method of claim 1, wherein the block strategy is further to reassign a subset of blocks in each color plane to a new pixel predictor based on compression performance.

3. The method of claim 2, wherein if a block is reassigned in one color plane to the new pixel predictor then the block is not reassigned in any other color plane.

4. The method of claim 3, wherein the pixel predictor is selected from a subset of available pixel predictors and wherein the new pixel predictor is selected from the available pixel predictors.

5. The method of claim 1, wherein performing context modeling on the plurality of residual values based on the subset of features to identify a plurality of residual clusters, further comprises:
   providing the plurality of residual values and the subset of features to a machine learning model, wherein the machine learning model identifies the plurality of residual clusters based on the subset of features.

6. A system, comprising:
   a processor;
   a computer readable storage medium including instructions stored thereon which, when executed by the processor, causes the system to:
   divide an input image into a plurality of blocks;
   determine a pixel predictor for each block based on a block strategy that assigns the pixel predictor to each color plane in a block of the plurality of blocks;
   determine a plurality of residual values using the pixel predictor for each block;
   select a plurality of features associated with the plurality of residual values wherein selecting the plurality of features associated with the plurality of residual values, further causes the system to:
   determine compression performance on a smaller version of the input image using a first subset of the features of the plurality of features and a second subset of features of the plurality of features; and
   compare the compression performance of the first subset and the compression performance of the second subset; and
   select the first subset or the second subset based on the highest compression performance resulting in a largest reduction in file size;
   perform context modeling on the plurality of residual values based on the subset of features to identify a plurality of residual clusters; and
   entropy code the plurality of residual clusters.

7. The system of claim 6, wherein the block strategy is further to reassign a subset of blocks in each color plane to a new pixel predictor based on compression performance.

8. The system of claim 7, wherein if a block is reassigned in one color plane to the new pixel predictor then the block is not reassigned in any other color plane.

9. The system of claim 8, wherein the pixel predictor is selected from a subset of available pixel predictors and wherein the new pixel predictor is selected from the available pixel predictors.

10. The system of claim 6, wherein to perform context modeling on the plurality of residual values based on the subset of features to identify a plurality of residual clusters, the instructions, when executed, further cause the system to:
    provide the plurality of residual values and the subset of features to a machine learning model, wherein the machine learning model identifies the plurality of residual clusters based on the subset of features.

11. A non-transitory computer-readable storage medium including instructions stored thereon which, when executed by at least one processor, cause the at least one processor to:
    divide an input image into a plurality of blocks;
    determine a pixel predictor for each block based on a block strategy that assigns the pixel predictor to each color plane in a block of the plurality of blocks;
    determine a plurality of residual values using the pixel predictor for each block;
    select a plurality of features associated with the plurality of residual values wherein selecting the plurality of features associated with the plurality of residual values, further causes the processor to:

determine compression performance on a smaller version of the input image using a first subset of the features of the plurality of features and a second subset of features of the plurality of features; and compare the compression performance of the first subset and the compression performance of the second subset; and select the first subset or the second subset based on the highest compression performance resulting in a largest reduction in file size;

perform context modeling on the plurality of residual values based on the subset of features to identify a plurality of residual clusters; and entropy code the plurality of residual clusters.

12. The non-transitory computer-readable storage medium of claim 11, wherein the block strategy is further to reassign a subset of blocks in each color plane to a new pixel predictor based on compression performance.

13. The non-transitory computer-readable storage medium of claim 12, wherein if a block is reassigned in one color plane to the new pixel predictor then the block is not reassigned in any other color plane.

14. The method of claim 1, wherein the smaller version of the input image is a sub-sample of the input image or a lower resolution image.

\* \* \* \* \*